UNITED STATES PATENT OFFICE.

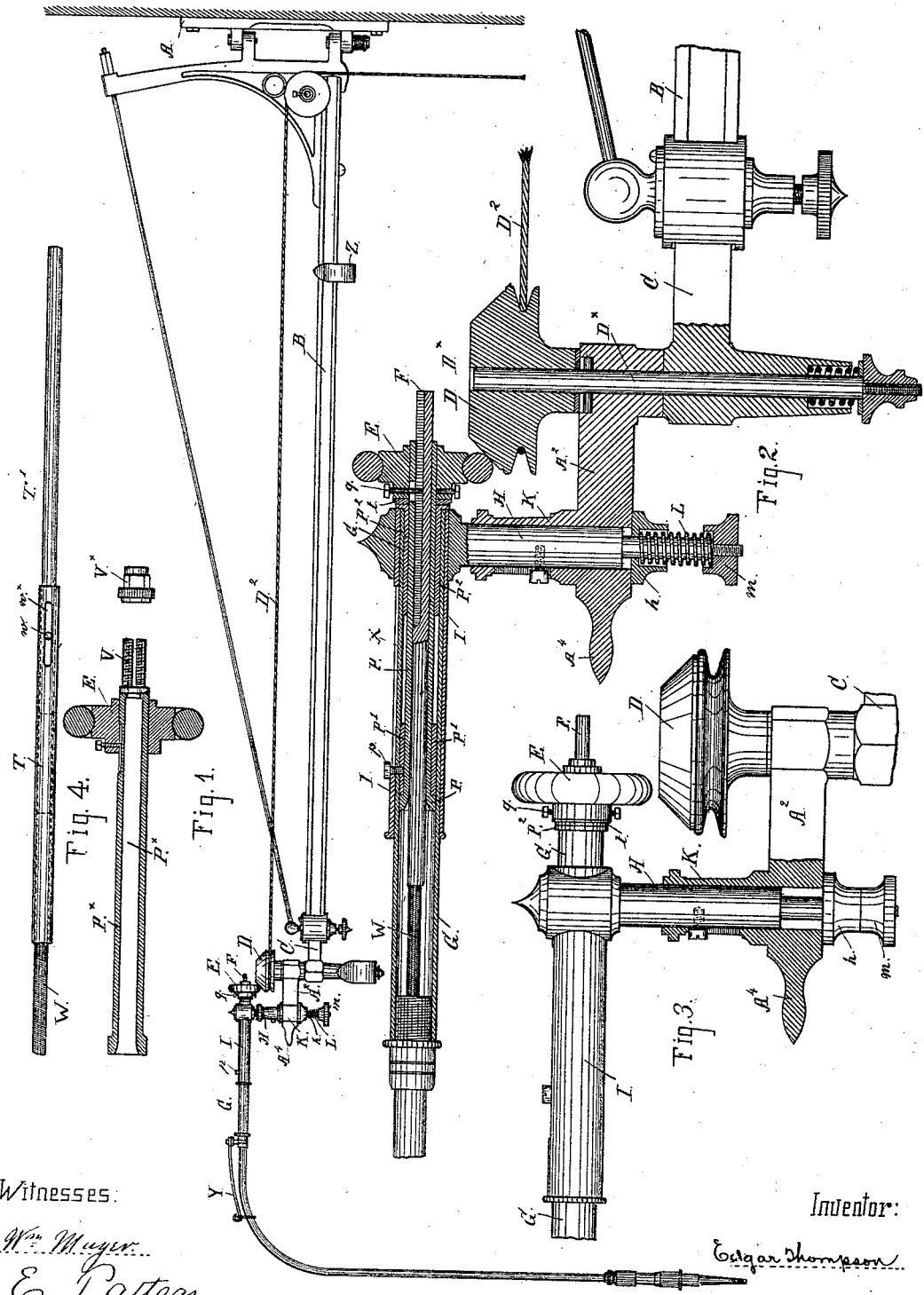

EDGAR THOMPSON, OF SAN FRANCISCO, CALIFORNIA.

DENTAL ENGINE.

SPECIFICATION forming part of Letters Patent No. 437,319, dated September 30, 1890.

Application filed December 2, 1889. Serial No. 332,298. (No model.)

*To all whom it may concern:*

Be it known that I, EDGAR THOMPSON, a citizen of the United States, residing in the city and county of San Francisco, State of California, have invented certain new and useful Improvements in Dental Engines, of which the following is a specification.

These improvements consist of a novel reversing driving-gear, and of certain construction and combination of parts, as hereinafter fully described, and pointed out in the claims. The same are illustrated, and the general construction of an engine of the kind known as "bracket-engines" for dentists' use is represented, in the drawings that accompany and form part of this specification.

Figure 1 is a side elevation of the complete engine with the exception of the motor-shaft and pulley, and Figs. 2, 3, and 4 the novel parts in detail and on a larger scale. Fig. 2 is a vertical section through the driving-gear and the adjacent parts of the frame and driven spindle. Fig. 3 is the same parts in elevation with the driven pulley raised for reversing the motion. Fig. 4 shows the parts of the telescoping spindle in detail.

The parts A B C constitute a swinging frame or bracket of ordinary construction.

D is the driving-wheel on upright shaft $D^*$, and $D^2$ is the driving-belt running from the motive shaft below.

E is the driven wheel, fast on the spindle F, to which it gives motion. The spindle forms the end of the cable or flexible shaft W.

H is a stationary post mounted on the swinging arm $A^2$ in a socket K on the outer end of that arm, having limited vertical movement in the socket without rotation, and I is a long tubular bearing on the upper end of the post, or formed as part of the post, to carry the tube or piece in which the spindle is fixed. The swinging arm has movement in an arc around the driving-pulley coinciding with the axis of the driving-pulley for the purpose of keeping the pulley in working contact while changing the angle of the operating-shaft with respect to the frame in a horizontal arc during work. The vertical movement of the post in its socket provides for throwing the driven wheel clear of the driver, while the longitudinal movement of the spindle-carrying tube in the long tubular bearing on the post allows the pulley, when so raised clear of the driver, to be shifted to the opposite side of the axis of rotation and thus set to be driven with reversed motion. A coil-spring L, between the shoulder $h$ and the thumb-nut $m$ on the post, keeps the wheel in working contact with the driver. The wheel is driven by frictional contact with the driver and is furnished with a rubber rim that can be renewed when worn. The top of the tubular bearing has a slot for the stop-screw $p$, that prevents rotation of the tube, but allows it to slide.

P is a sleeve around the spindle, on which is secured the wheel E by the screw $q$, and $P'$ $P^2$ are tubular bushings between the tube and the sleeve. Between these two pieces a space X is left for an oil-receptacle to keep the bearings well lubricated. The screw $p$ takes into the part $P'$, while the outer piece $P^2$ has a shouldered end that fits over the end of the tube G and has the hub of the pulley set up against it, a washer $t$ being placed between them. The spindle F extends through the sleeve and is grooved to take the point of the screw $q$, the groove being of suitable length to allow longitudinal play of the spindle.

A construction of telescoping spindle and coupling for the flexible shafting in these engines is illustrated in Fig. 4, which I provide for use instead of the ordinary slot and screw shown in Fig. 1, and which I consider preferable to that mode of connecting the spindle and wheel. This spindle and coupling is formed of the tubular section T, the rod $T'$, sliding in it and connected by a slot and pin $w\ w^\times$, and the long tubular hub $P^\times$, which corresponds to the sleeve P and on which the wheel E is fixed. The end V of the tube nearest the pulley is screw-threaded and split to form a clamp, and is fitted with a clamp-nut $V^\times$ to grip and hold the outer end of the spindle. While this end of the spindle is held by this clamp and rotates with the pulley, the tubular section to which the cable is fastened is capable of moving longitudinally under the variations in the length of the cable due to the flexures or bending of that part in curves.

The suspension-spring Y is applied, as illustrated in Fig. 1, to support the cable, as the weight of the cable and the hand-piece at the end when allowed to hang down might have a tendency to make a permanent bend in the cable. A hook Z is provided on the bracket-frame as a rest to support the cable when the engine is not in use, the arm A³ being swung around at such time to bring the cable close against the bracket.

Fig. 3 of the drawings illustrates the position of the wheel E when it is being shifted on the driving-wheel from one side to the opposite side of the center. In such adjustment the post H is pressed upward in its socket by applying pressure of the hand against the head $m$ from below until the wheel clears the top of the driver, and while the post is held up the wheel is moved over to the opposite side of the driver by sliding the spindle-carrying tube in its tubular bearings. On releasing the post the coil-spring draws it down and brings the pulley into contact with the driver. In this change of position the proper degree of pressure or working contact remains the same, and when once adjusted it is not affected by shifting the pulley in this manner.

The horn or projection A⁴ on the end of the swinging arm furnishes a convenient rest or bearing for the fingers while the end of the post is pressed upward, so that one hand can be used to raise and hold up the pulley, leaving the other hand free to shift the pulley across the driver to the opposite side.

Having thus fully described my invention, what I claim, and desire to secure by Letters Patent, is—

1. The combination of a driving-wheel, a driven wheel operated thereby, a movable post, a sliding carrier mounted in said post, and the spindle of the driven wheel mounted in said sliding carrier, all substantially as and for the purpose set forth.

2. In a dental engine, the combination, with the supporting-bracket, an upright shaft supported in bearings on said bracket, and a driving-wheel loosely mounted on said shaft, of a swinging arm on said bracket, a movable post mounted in a socket of said arm adjacent to said upright shaft, a tubular bearing on the upper end of the post, a sliding carrier in the tubular bearing, a shaft or spindle carried thereby, and driven wheel fast on the spindle, as set forth.

3. In combination with the cable or flexible shafting and its driving-pulley, the two-part spindle composed of the tubular section T, telescoping rod T', having slot-and-pin connection, and the long hub P×, having the split clamp and clamp-nut, substantially as described.

In testimony that I claim the foregoing I have hereunto set my hand and seal.

EDGAR THOMPSON. [L. S.]

Witnesses:
EDWARD E. OSBORN,
CHAS. E. KELLY.